A. LAURENCICH.
GRAPHOPHONE.
APPLICATION FILED NOV. 1, 1919.
1,364,201.
Patented Jan. 4, 1921.
2 SHEETS—SHEET 1.
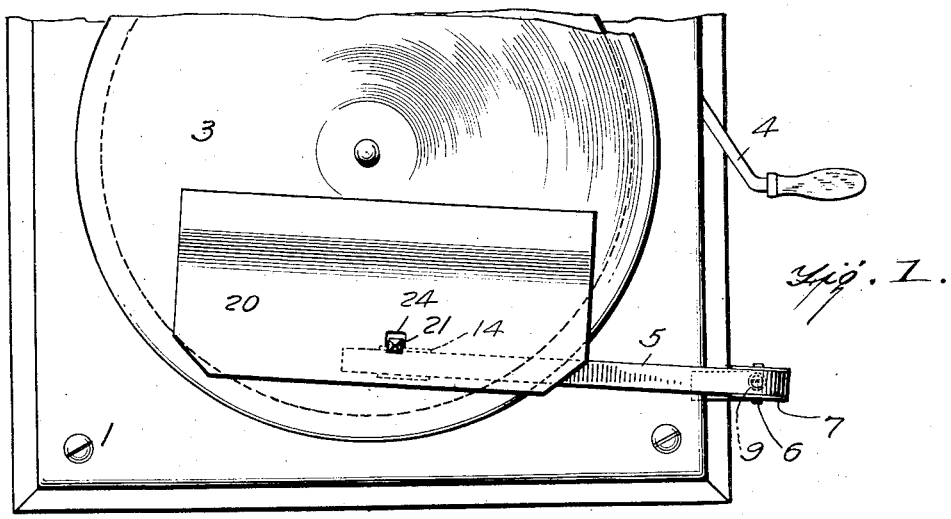
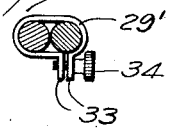
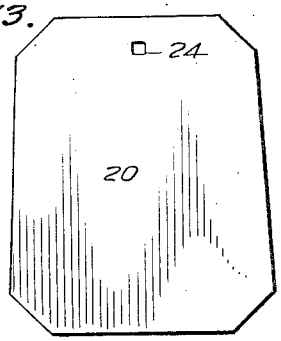
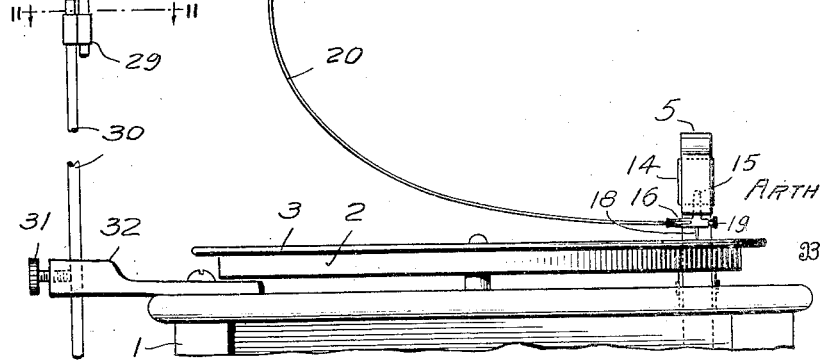
Inventor
ARTHUR LAURENCICH,
Attorneys

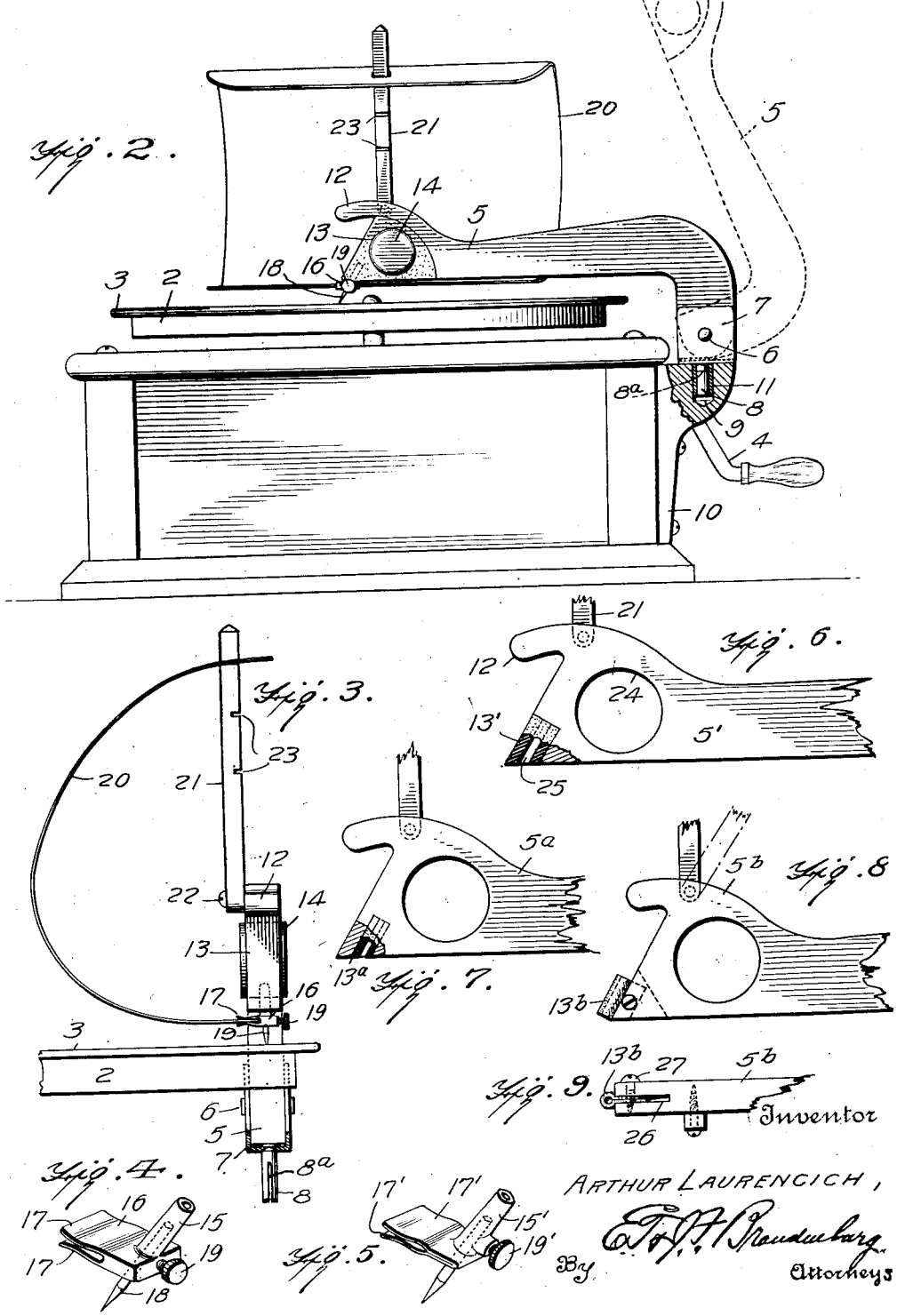

UNITED STATES PATENT OFFICE.

ARTHUR LAURENCICH, OF WASHINGTON, DISTRICT OF COLUMBIA.

GRAPHOPHONE.

1,364,201. Specification of Letters Patent. Patented Jan. 4, 1921.

Application filed November 1, 1919. Serial No. 334,935.

*To all whom it may concern:*

Be it known that I, ARTHUR LAURENCICH, a citizen of the United States, residing at Washington, in the District of Columbia, have invented certain new and useful Improvements in Graphophones, of which the following is a specification.

My invention relates, generally, to disk graphophones, but, more particularly, to a novel sound-producing and amplifying device therefor; and the object is to provide such a device which shall be exceedingly economical in construction, easily and quickly adjusted in position, and thoroughly efficient in operation, for the purpose intended.

With this object in view, and others appearing as the specification proceeds, the invention resides in the novel construction, combination, and arrangement of parts, as will be hereinafter fully described, summed up in the claims, and illustrated in the drawings.

The accompanying drawings, forming part of this specification, disclose concrete embodiments capable of carrying out the underlying principles of the invention. Like reference characters denote corresponding parts throughout the several views. Briefly described:

Figure 1 is a top plan view of a disk graphophone equipped with my improvements;

Fig. 2 is a view in side elevation thereof;

Fig. 3 is a view taken at right angles to the position shown in Fig. 2;

Fig. 4 is a detached detail view, in perspective, of the combined needle- and sound-amplifier holder;

Fig. 5 is a similar view of a somewhat modified form of combined needle- and sound-amplifier holder;

Fig. 6 is a fragmental view, partly in section, of the swinging reproducer-arm;

Fig. 7 is a similar view, but showing the bushing for the reception of the tubular shank of the needle-holder slightly removed from the end of the reproducer-arm, instead of at the end thereof, as in Fig. 6;

Fig. 8 is a fragmental view, in side elevation, of a reproducer-arm carrying a slightly modified form of bushing for the reception of the tubular shank of the needle-holder;

Fig. 9 is a fragmental view, in bottom plan, of the reproducer-arm and bushing shown in Fig. 8;

Fig. 10 is a view in elevation of a disk-graphophone, showing a slightly modified form of means for holding the upper end of the sound-amplifying member;

Fig. 11 is a sectional view on the line 11—11, Fig. 10, looking in the direction of the arrows;

Fig. 12 is a sectional view taken similarly to Fig. 11, but showing a slightly modified form of clamping means for the curved supporting-arm shown in Fig. 10; and Fig. 13 is a view in front elevation of the flexible sound-producing plate or sheet.

Referring, now, in detail, to the drawings: 1 designates the box or cabinet, of conventional form, for supporting the revoluble table or platform 2 for the disk-record 3 and for inclosing the spring-motor, if it is desired to revolve the table by a motor. In this instance, I have shown manually-controlled means for revolving the table, such as a crank 4.

The swinging reproducer-arm 5 is pivoted at 6 in a U-shaped yoke 7 swiveled in the top end of a pin 8 split at 8$^a$, and removably supported in a vertical socket 9 in a bracket 10 carried by the cabinet 1. Desirably, a bushing 11 is interposed between the pin 8 and the wall of the socket 9. By the construction described, it will be noted that the reproducer-arm may be readily removed from the cabinet 1, as for storage, shipment, or repairs.

The reproducer-arm is preferably provided at the end thereof opposite the pivotal end, with a finger, for convenient manipulation of the arm in swinging it toward and away from the disk-record 3 and the table 2.

The reproducer-arm preferably carries at the finger-end thereof, a cushioning body 13, which may be of any suitable material, such as rubber. The cushioning element 13 is apertured for the reception of a suitable weight, removably positioned in such aperture. It has been found desirable, under certain conditions, to weight the end of the reproducer-arm.

The cushioning body 13 is suitably recessed on its bottom for the reception of the tubular shank 15 of a combined needle-holder and sound amplifier support 16. As clearly shown in Fig. 4, the shank 15 is inclined with respect to the sound-amplifier supporting portion 16, and the latter is bifurcated toward one end thereof, to form spring lips, which are slightly bowed in opposite directions so as to provide a central, transversely-extending gripping portion and divergent ends. A needle 18, in use, is slipped into the tubular shank 15, as shown in Fig. 4, and is adjustably held therein by a set-screw 19, and the shank 15 is pushed into the socket provided therefor in the bottom of the cushioning body 13, and is frictionally retained therein.

Fig. 5 discloses a slightly modified form of combined needle-holder and sound-amplifier support; and, as therein shown, it comprises a metallic strip doubled upon itself and suitably bent to provide the separated lips 17', 17'. The shank 15' (corresponding to the shank 15 shown in Fig. 4) is carried by the bent strip, as by being welded or soldered thereto; and a set-screw 19' is provided.

The sound-amplifier comprises a flexible sheet, 20, preferably, from the standpoint of economy, of paper, of requisite strength and flexibility. Experiments have demonstrated that the best results are obtained by bowing this paper sheet 20; and the invention, therefore, comprehends means for detachably holding this sheet in bowed position. The very simple and efficient means shown in the drawings, as an exemplary construction, includes the member 16 (previously described), which holds the paper sheet at one end thereof—the lower end, in use—said end being slipped between the lips 17, 17 and frictionally held thereby, as clearly shown in Fig. 3. Said paper-holding means also comprises a stick or pole 21 suitably carried or supported, in this instance by the reproducer-arm 5. Said stick or pole is preferably pivotally supported, at its lower end, on said arm 5, as by a screw or pivot-pin 22, which binds the stick 21 to said arm with sufficient pressure to set up a substantial resistance to accidental displacement of said stick from the upright position thereof, in use, but permitting forcible, intentional movement of said stick, when it is desired to disassemble the parts, as for shipment, storage, or the like.

The stick 21 is preferably rectangular in cross section, and may be provided longitudinally with a series of notches or grooves 23.

The paper sheet 20 is provided, at one end, with a rectangular hole 24, whereby the stick 21 may be projected therethrough, and the paper sheet held against movement lengthwise of said stick by one wall of said hole 24 engaging one of the grooves or notches 23. The plurality of grooves 23 is provided, so that different length paper sheets may be used. If a paper sheet of lesser length than the one shown in the drawings be used, then it may be positioned in the second groove from the top of the stick 21, instead of in the top groove.

Fig. 6 discloses a slight modification of reproducer-arm 5', in which the weight is carried in an aperture 24 in the arm, and not in the cushioning body (as shown in Figs. 2 and 3), and in which the cushioning element 13' is carried by the end of said arm, to one side of the aperture 24. The cushioning body 13' is provided with a recess or socket 25 for the reception of the needle-holding shank 15 (shown in Fig. 4).

Fig. 7 discloses a construction very closely resembling that shown in Fig. 6, the only difference being that the cushion insert 13ᵃ is disposed in a socket in the reproducer-arm 5ᵃ slightly removed from the end thereof, instead of at the end, as shown in Fig. 6.

Fig. 8 discloses a reproducer-arm 5ᵇ carrying a slightly different form of cushioning body 13ᵇ (see, also, Fig. 9). In this instance, the reproducer-arm is slit at its end, as shown at 26, and a strip of rubber or felt is doubled upon itself and slipped into said slit and there secured in any suitable manner, as by a screw 27. The rubber strip is bent so as to provide a tubular socket-portion exterior of the arm, for the reception of the shank 15 (shown in Fig. 4) of the needle-holder.

Referring, now, to Figs. 10 and 11: Herein is disclosed a slightly modified form of holding means for the upper end of the paper sheet 20. A curved arm 28 is provided, at one end, with a hook 29 adapted to be projected through the hole 24 (see Fig. 13) of the paper sheet 20. The curved arm or rod 28 is frictionally held, at its other end, in a spring clamp 29, formed from a strip of spring material bent to provide two curved spring tubular jaws or sleeves, one thereof encircling said arm 28 and the other thereof encircling a rod 30 adjustably held, by a set screw 31, in a bracket 32 carried by the box or cabinet 1.

The operation will be apparent: When the needle 18 is in operative position and the table 2 with a disk record 3 thereon is revolved, the curved or bowed member 20 will be vibrated and will throw the sound-waves toward the listener.

Fig. 12 shows slight modification of the member 29 shown in Fig. 11. In Fig. 12 the member for retaining the arm 28 (see Fig. 10) in position comprises a strap 29' encircling the arm 28 and the rod 30 and provided with angled terminals 33, 33, through which passes a set-screw 34 for tightening the band or strap 29'.

Having thus fully described my invention, what I claim as new and desire to secure by Letters Patent is:

1. In a disk graphophone, the combination of a reproducer-arm, a supporting-needle, a bowed vibratory member vibrated by said needle, and a member, supported by said arm having spring lips for frictionally holding said vibratory member, and a tubular stem for frictionally holding said needle.

2. In a disk graphophone, the combination of a reproducer-arm, a reproducer-needle, a curved vibratory member vibrated by said needle, means for holding said needle and one end of said vibratory member, and a member carried by said reproducer-arm for engaging the other end of said vibratory member and thereby holding the latter in bowed position.

3. In a disk graphophone, the combination of a reproducer-arm, a reproducer-needle, a curved vibratory member vibrated by said needle, means for holding said needle and one end of said vibratory member, and a member carried by said reproducer-arm and having a series of grooves for holding the other end of said vibratory member and thus maintaining the latter in bowed position.

4. In a disk graphophone, the combination of a reproducer-arm, a reproducer-needle, a curved vibratory member vibrated by said needle, means for holding said needle and one end of said vibratory member, a member pivoted to said reproducer-arm for engaging the other end of said vibratory member and thus holding it in bowed position.

5. The combination with a graphophone having a rotatable record, of a sound reproducing and amplifying device therefor comprising a supporting arm adapted to move adjacent the surface of the record, a reproducer needle carried by said supporting arm, and an amplifier comprising a sheet of flexible material disposed substantially above the needle and entirely supported by the arm and vibrated by said needle.

6. The combination with a graphophone having a rotatable record, of a sound reproducing and amplifying device therefor, said sound reproducing and amplifying device comprising a pivoted supporting arm adapted to move adjacent the surface of the record, a reproducer needle carried by the free end of the arm, and an amplifier comprising a sheet of flexible material disposed substantially above the needle and entirely supported by the arm.

7. The combination with a graphophone having a rotatable record, of a sound-reproducing and amplifying device therefor, said sound reproducing and amplifying device comprising a pivoted supporting arm having its free end disposed over the record and movable adjacent the surface thereof, a reproducing needle carried by the free end of the arm, and an amplifier comprising a sheet of flexible material disposed on the pivoted supporting arm and entirely supported thereby.

8. The combination with a graphophone having a rotatable record, of a movable supporting arm adapted to move in a plane adjacent the record face, a reproducing needle carried by said arm and adapted to engage the record, an amplifier comprising a bent sheet of flexible material, the ends of said sheet being spaced apart, said amplifier being entirely supported by the arm and having its bend at an angle to the record face.

9. The combination with a graphophone having a rotatable record, of a movable supporting arm adapted to move in a plane adjacent the record face, a reproducing needle carried by said arm and adapted to engage the record, an amplifier comprising a bent sheet of flexible material, the ends of said sheet being spaced apart, said amplifier being supported by the arm and disposed adjacent the reproducing needle.

10. The combination with a graphophone having a rotatable record, of a movable supporting arm adapted to move in a plane adjacent the record surface, a reproducing needle carried by said arm and adapted to engage the record, an amplifier comprising a bent sheet of flexible material, the ends of said sheet being spaced apart, said amplifier being carried by the arm and bent in a direction away from the record and needle and disposed adjacent the latter.

In testimony whereof, I affix my signature in the presence of two witnesses.

ARTHUR LAURENCICH.

Witnesses:
H. P. HOWARD,
E. T. BRANDENBURG.